(12) United States Patent
Johnson

(10) Patent No.: US 8,302,363 B1
(45) Date of Patent: Nov. 6, 2012

(54) COMPOSITE INTERLOCKING STRUCTURE

(75) Inventor: David W. Johnson, San Diego, CA (US)

(73) Assignee: Ebert Composites Corporation, Chula Vista, CA (US)

( * ) Notice: Subject to any disclaimer, the term of this patent is extended or adjusted under 35 U.S.C. 154(b) by 130 days.

(21) Appl. No.: 12/778,293

(22) Filed: May 12, 2010

Related U.S. Application Data

(60) Provisional application No. 61/177,554, filed on May 12, 2009.

(51) Int. Cl.
*E04H 12/00* (2006.01)

(52) U.S. Cl. ....... 52/655.1; 52/127.4; 52/637; 52/648.1; 52/653.2; 52/742.13

(58) Field of Classification Search ............... 52/637, 52/643, 646, 648.1, 653.1, 653.2, 650.3, 52/655.1, 127.4, 173.3, 742.13; 136/246
See application file for complete search history.

(56) References Cited

U.S. PATENT DOCUMENTS

| | | | | |
|---|---|---|---|---|
| 3,100,555 A | * | 8/1963 | Ashton | 52/651.01 |
| 3,421,280 A | * | 1/1969 | Attwood | 52/650.3 |
| 3,927,950 A | * | 12/1975 | Herrmann et al. | 403/346 |
| 4,446,666 A | * | 5/1984 | Gilman | 52/648.1 |
| 4,715,503 A | * | 12/1987 | Johnson | 211/74 |
| 4,809,146 A | * | 2/1989 | Johnson | 362/367 |
| 4,825,620 A | * | 5/1989 | Johnson | 52/646 |
| 4,991,726 A | * | 2/1991 | Johnson | 211/189 |
| 4,995,377 A | * | 2/1991 | Eiden | 126/605 |
| 5,024,036 A | * | 6/1991 | Johnson | 52/600 |
| 5,185,982 A | * | 2/1993 | Hostetler | 52/646 |
| 5,197,253 A | * | 3/1993 | Johnson | 52/646 |
| 5,285,612 A | * | 2/1994 | Johnson | 52/655.1 |
| 5,285,613 A | * | 2/1994 | Goldsworthy et al. | 52/648.1 |
| 5,319,901 A | * | 6/1994 | Goldsworthy et al. | 52/651.02 |
| 5,469,678 A | * | 11/1995 | Zamerovsky | 52/263 |
| 5,528,870 A | * | 6/1996 | Zamerovsky | 52/263 |
| 5,617,692 A | * | 4/1997 | Johnson et al. | 52/651.02 |
| 5,687,520 A | * | 11/1997 | Stranahan et al. | 52/233 |
| 5,704,185 A | * | 1/1998 | Lindsay | 52/655.1 |
| 5,771,655 A | * | 6/1998 | Strickland et al. | 52/745.2 |
| 5,802,772 A | * | 9/1998 | Burke et al. | 52/6 |
| 5,832,689 A | * | 11/1998 | Curll | 52/656.9 |
| 5,944,441 A | * | 8/1999 | Schutze | 403/403 |
| 6,076,324 A | * | 6/2000 | Daily et al. | 52/648.1 |
| 6,485,152 B2 | * | 11/2002 | Wood | 359/853 |
| 6,930,237 B2 | * | 8/2005 | Mattiuzzo | 136/251 |
| D595,645 S | * | 7/2009 | Beghelli | D13/102 |
| 2010/0043329 A1 | * | 2/2010 | Dagg | 52/414 |
| 2011/0030285 A1 | * | 2/2011 | Kaufman | 52/82 |

* cited by examiner

*Primary Examiner* — Brian Glessner
*Assistant Examiner* — Adriana Figueroa
(74) *Attorney, Agent, or Firm* — Stephen C. Beuerle; Procopio Cory Hargreaves & Savitch LLP

(57) ABSTRACT

An interlocking support structure has an array of rectangular cells arranged in at least one layer, each cell having four sides, opposite ends, and eight corners, and sharing common sides and corners with any adjacent cells. The cells are formed by sets of spaced, parallel elongate members extending in x, y and z directions, with the x, y and z members interlocked with one another at the corners of the cells to form interlocking corner joints. Each structural member is hollow at least in the vicinity of each corner joint with which it intersects, and communicates with the other structural members at the respective corner joints. A plug of hardened, initially flowable material fills the hollow interior of the interlocking structural members at least at the corner joints and adheres to the internal surfaces of the members at the corner joints to secure the members together at each corner in the rectangular array.

20 Claims, 8 Drawing Sheets

COMPOSITE INTERLOCKING STRUCTURE

CROSS-REFERENCE TO RELATED APPLICATION

This application claims the benefit of provisional patent application 61/177,554, filed May 12, 2009 under 35 U.S.C. 119(e), and the aforementioned patent application is incorporated by reference herein as though set forth in full.

BACKGROUND

1. Field of the Invention

The present invention relates generally to composite interlocking structures, and particularly to composite interlocking structures for supporting photovoltaic panels.

2. Related Art

Support structures for photovoltaic panels and other supported objects have been proposed in the past, but many suffer from a number of drawbacks. The support structures are too heavy; the support structures require custom site fabrication with teams of installers and can take many days to complete; the support structures are not self standing; and the support structures require frequent maintenance such as frequent paintings to inhibit rust development.

SUMMARY

An aspect of the invention involves a space frame composite interlocking structure using tubular rectangular composite pultrusions. The composite interlocking structure may come in the form of a kit that is very rapid to assemble. In one embodiment, the composite interlocking structure includes a six member interlocking structure, where five members are interlocked and a final "key" completes the joint. Diagonals are included as "x-Bracing' and are designed as compression-only members; and the center of each interconnecting joint is injected with an internal structural adhesive or other hardened, flowable material such as concrete, epoxy, or the like, just after assembly of the space frame. This provides a monolithic interior that binds to the internal walls of each member and provides exceptional internal shear strength. This, in turn, results in a joint system that is greater or equal to the parent member's strength, which is the best one can expect from a space frame node. In an exemplary application of the space frame composite interlocking structure, the composite interlocking structure supports commercial, rectangular photovoltaic panels.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for an interlocking space frame structure in which a plurality of hollow frame members are assembled to form a generally rectangular lattice structure having nodes or joints where the frame members intersect, with the internal space at each node or joint filled with an adhesive material to form a monolithic, shear-force-carrying-plug. The remainder of each frame member may be filled with a lightweight foam material or the like, or end stops may be provided within each frame member adjacent the joint to form the ends of the adhesive plug. Clearly the entire structure could be filled with adhesive, or concrete, or any high strength material, such as epoxy, which flows, or can be pressurized and pumped, and then eventually cures into a monolithic interior structure.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

Figure 1:
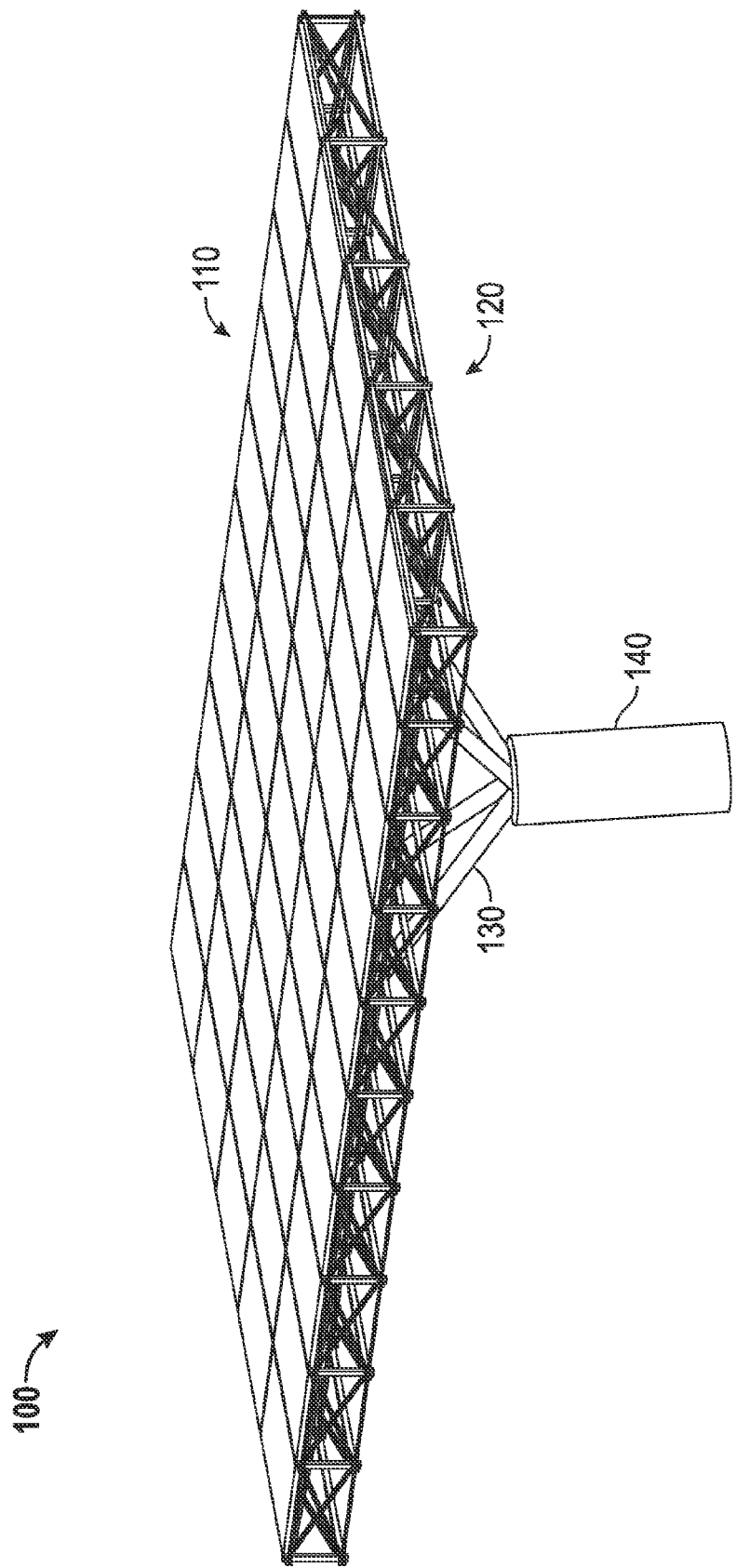
FIG. 1 is a top perspective view of one embodiment of a composite interlocking support structure supporting a plurality of photovoltaic panels.
Figure 2:
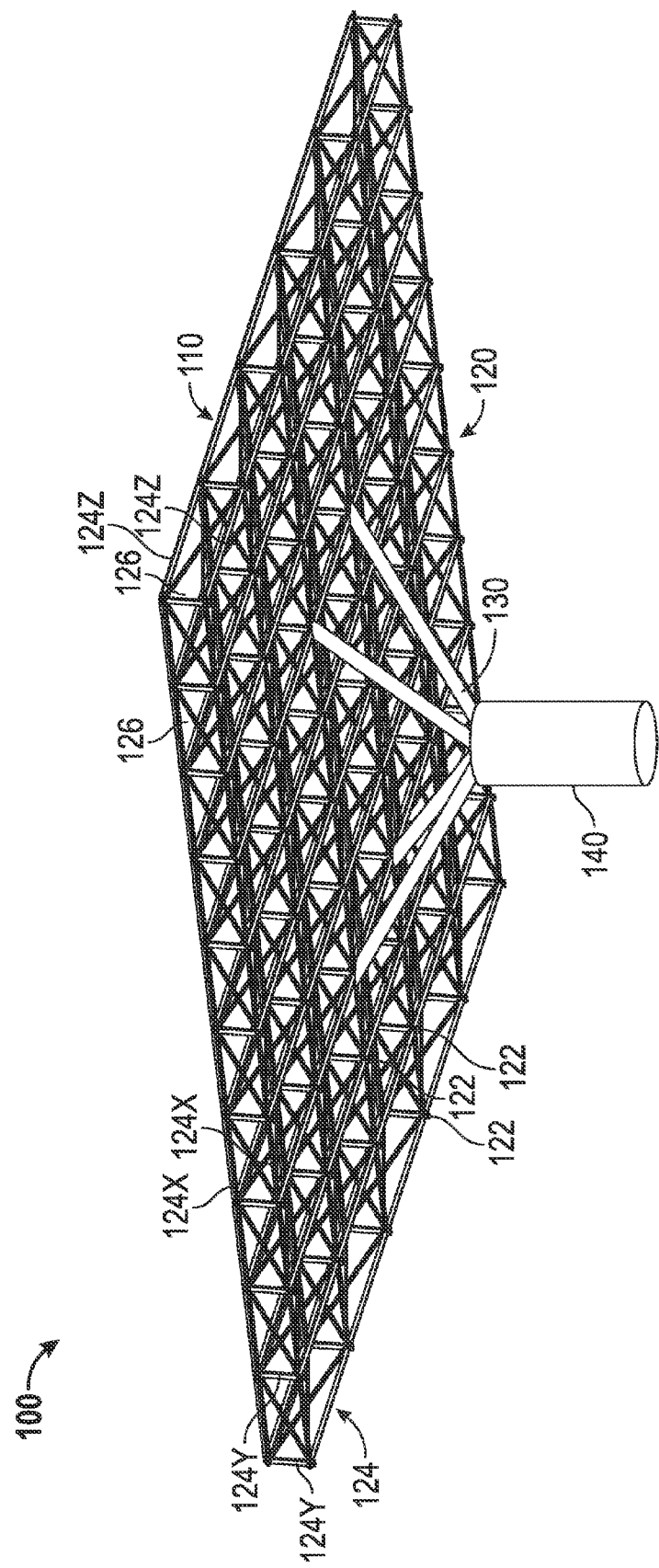
FIG. 2 is a bottom perspective view of the structure of FIG. 1.
Figure 3:
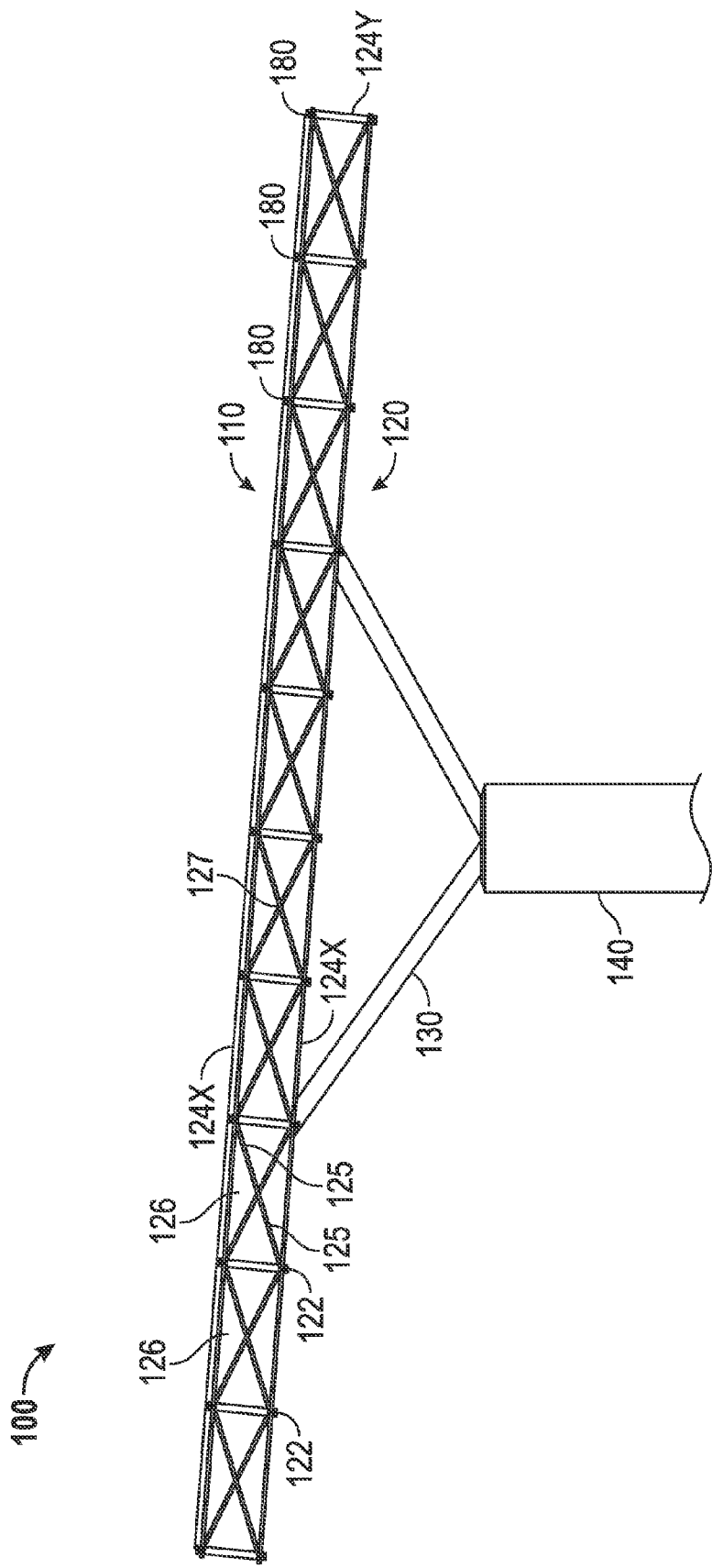
FIG. 3 is a side-elevational view of the structure of FIGS. 1 and 2.

FIGS. 1 to 3 illustrate one embodiment of a space frame structure 120 supporting a photovoltaic panel assembly 100 which comprises a plurality of photovoltaic panels 110. The structure 120 may be used to support other objects in alternative embodiments. FIGS. 4 to 10B illustrate the assembly of the frame structure and the corner joint structure in more detail. In the illustrated embodiment, the space frame structure 120 is supported via support pole or tower 140 which is connected to structure 120 at its upper end by a plurality of support arms 130, each of which is connected to a node or joint 122 of the space frame structure 120. In the illustrated embodiment, four support arms 130 are provided, but a greater or lesser number may be provided in alternative embodiments. The single pole 140 and support arms 130 make up a support pole system for the composite support structure 120. Although the composite structure 100 is shown and described herein as a turn-key composite parking structure supporting commercially available photovoltaic panels 110, in alternative embodiments/applications, the composite structure 100 may be used for supporting other objects. Further, although a plurality of photovoltaic panels 110 are shown/described, in one or more embodiments, photovoltaic (PV) panel(s)/cell(s) or other types of energy converting unit(s) that convert solar energy into electrical energy may be used. Examples of energy converting unit(s) used in one or more embodiments of the composite photovoltaic panel structure 100 include, but not by way of limitation, photovoltaic cell(s), thermal-solar cell(s), concentrating cell(s), or other unit(s) that convert solar energy into electrical energy. One or more servo mechanisms may be incorporated into the composite photovoltaic panel structure 100 to track the sun and/or move the photovoltaic panels 110 for optimal solar energy collection and conversion.

Figure 10A:
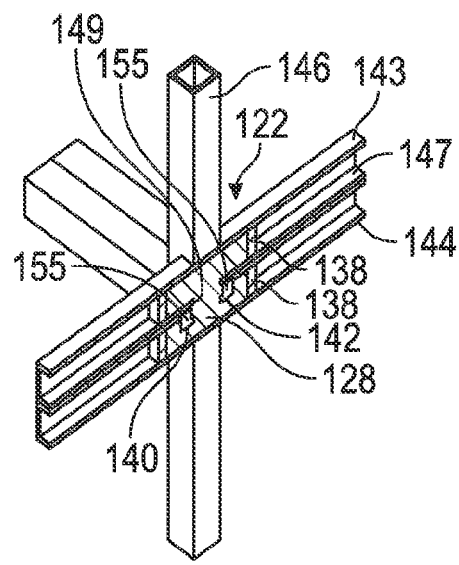
FIGS. 10A and 10B are perspective sectional views of opposite halves of the joint on the lines 10A-10A and 10B-10B, respectively, of FIG. 9.
Figure 10B:
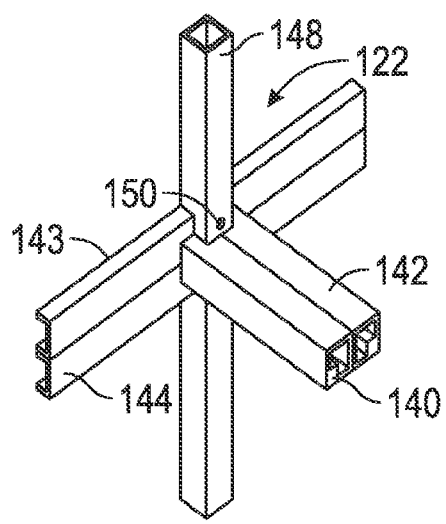

The composite support structure 120 involves a space frame composite interlocking structure using tubular rectangular composite pultrusions. The tubular members may be made from various resin impregnated fiber composite materials, containing fibers of glass, Kevlar™, carbon, or the like and a matrix of thermoplastic material such as polypropylene, PET, PPS, PEEK, PEI or thermoset resin, or epoxy. The composite interlocking structure may come in the form of a kit that is very rapid to assemble. The composite interlocking structure kit may be assembled into, for example, a 30 ft. by 30 ft. by 1.5 ft. space frame by two installers in a relatively short period of time. The composite interlocking structure includes a six member interlocking structure, where five members are interlocked and a final "key" ensures the joint is completed. The six member interlocking mechanism has some features in common with the structure described in U.S. Pat. Nos. 5,024,036, 5,618,692, 5,285,613, and 5,319,901, which are incorporated by reference herein as though set forth in full, but the interlocking members are modified to improve joint strength and ease of assembly, as described in more detail below, and diagonals 125 are included as "x-Bracing' in each rectangular "cell" 126 of the lattice-like frame, which are designed as compression-only members. Additionally, the center of each interconnecting joint or node 122 (there are 132 in above example) is injected with an internal structural adhesive, just after assembly of the space frame, as best illustrated in FIGS. 10A and 10B. The adhesive hardens to form a monolithic plug 128, as illustrated in FIG. 10A. Not shown in 10A is the fact that the x-braced diagonals can also be installed prior to addition of adhesive, with an extra "fill-hole" provided in the six-member joint, so that the monolithic plug can extend at least part-way into the diagonal members. This provides a monolithic interior that binds to the internal walls of each member 124 and provides exceptional internal shear strength. This, in turn, results in a joint system that is greater or equal to the parent member's strength, which is the best one can expect from a space frame node.

As best illustrated in FIGS. 2 and 3, the interlocking support structure 120 comprises a multi-cellular lattice constructed from a matrix of elongated members 124 which intersect at joints 122 at which the members interlock. The interlocking matrix or lattice forms a plurality of generally rectangular cells which are arranged in a single layer in the illustrated embodiment, but may be in two or more layers in alternative embodiments, depending on strength requirements. Each cell has six planar-sides, twelve dual-member edges, and eight corner joints, with each cell sharing common sides, edges, and corners with any adjacent cell. Additionally, each cell side (whether common or external) has two diagonal members 125 extending between diagonally opposite corners or joints to form an x-shaped brace. The members 125 forming the x-shaped brace may also comprise tubular pultrusion members of composite material. One or both members of each x-shaped pair may be notched at their center to interlock with the other member at the cross-over 127 between the two diagonal members on each cell side. Each member 125 may also have indented ends shaped to conform to the surfaces of the interlocking member 124 at the corners, and may be bonded to the interlocking members in any desired manner, or may be bonded to themselves at their respective notched, interlocking section.

The joint interlock arrangement is similar to that described in U.S. Pat. No. 5,024,036 referenced above, the contents of which are incorporated herein by reference, but the elongate members are modified to improve the joint strength and ease of assembly. As seen in FIGS. 2 and 3, the space frame excluding the diagonal x-brace members is made up of sets of elongate members extending in orthogonal directions which are designated X, Y and Z in the drawings (see members labeled 124X, 124Y and 124Z). Although the three sets of members are perpendicular in the illustrated embodiment, two or more of the sets of members may be non-orthogonal in alternative embodiments. The terms X, Y, and Z do not have meaning relative to the Earth's vertical and horizontal axes, and are just designated herein as being orthogonal to each other at 90 degree angles.

In the illustrated embodiment, each member 124 comprises a parallel, contiguous pair of elongated tubes, and the members extend generally perpendicular to one another in X, Y and Z directions, although they may be non-perpendicular in alternative embodiments, as noted above. Each tubular member is a tubular rectangular composite pultrusion. The tubular members may be made from various resin impregnated fiber composite materials, containing fibers of glass, Kevlar™, carbon, or the like and a matrix of thermoplastic material such as polypropylene, thermoset resin, or epoxy. Each corner joint is made up of six tubular members, and cut-away portions of the six members forming one joint are shown separate from one another in FIG. 4. The members comprise a first pair of tubes 140 and 142 which extend in a first or X-direction, a second pair of tubes 146, 148 which extend in a second or Y-direction, and a third pair of tubes 143, 144 which extend in a third or Z-direction. The first tubes 140, 142 have notches or indents 132 which face one another. The tubes 140, 142 are of non-rectangular internal shape, as can be seen in the notches 132 and at the exposed end of each tube, with an internal ridge 155 extending along the length of each tube. Although not shown in FIG. 4, notches 132 are provided at spaced positions along each tube 140, 142 corresponding successive node or joint locations, for example the joint locations along members 124X in FIG. 3. Tube 144 has notches 134 at spaced intervals corresponding to the desired locations of corner joints 122. Tube 143 is not notched but has spaced openings 149 (FIG. 10A) in one wall 147 which is the lower wall when the joint is oriented as in FIGS. 4 to 10B, with each opening 149 designed to align with a respective joint 122. The opening 149 is not visible in FIG. 4, but can be seen in the sectional view of the assembled joint in FIG. 10A. Tubes 146, 148 each have notches 135 of similar shape to notches 134 in tubes 144. Tube 148 has an injection hole 150 which communicates with notch 135. The tubes 146, 148 which extend in a Y direction forming members 124Y in FIG. 3 may be shorter than the X and Z direction tubes, and in the illustrated embodiment each tube 146, 148 has two notches adjacent its respective ends. If two or more layers of rectangular cells are to be included in the structure, the tubes 146, 148 are increased in length to accommodate one or more additional layers, with additional sets of tubes 140, 142 and 143, 144 provided in the X and Z directions to form the additional layer or layers. A hole 150 is associated with each notch in each of the tubes 148 of the support structure.

Figure 5:
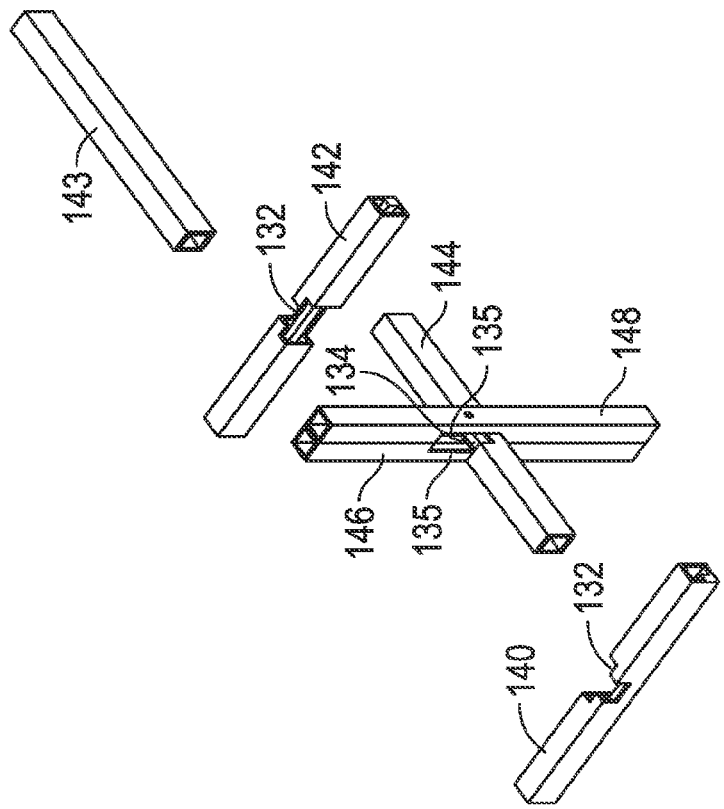
FIGS. 5 to 7 illustrate successive steps in the assembly of the members of FIG. 4 to form a corner joint.
Figure 4:
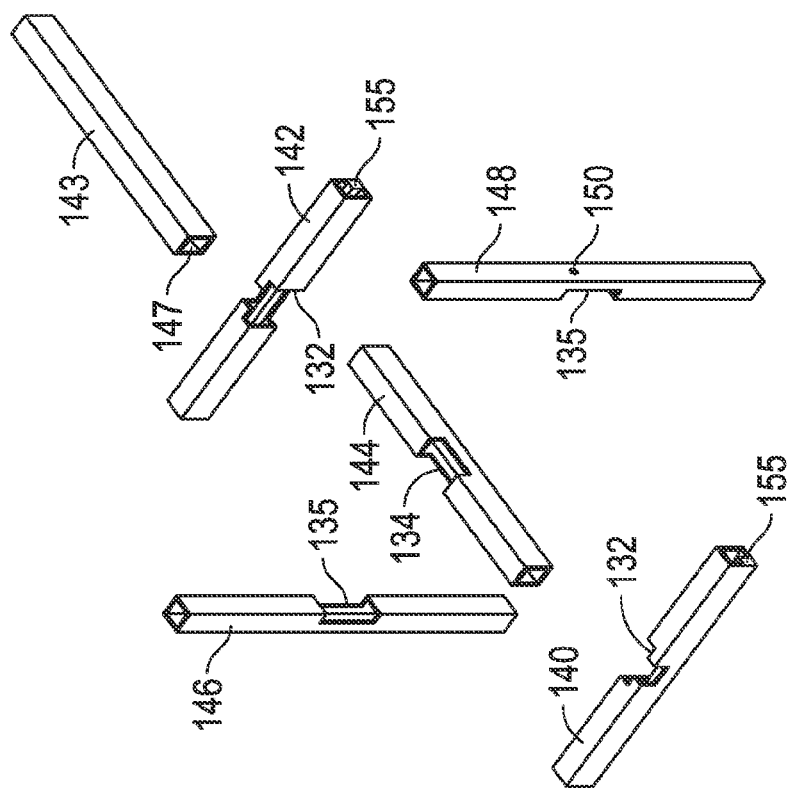
FIG. 4 is an exploded perspective view of the six interlocking members forming each corner joint or node in the support structure of FIGS. 1 to 3, not including the X-braced diagonal members.
Figure 6:
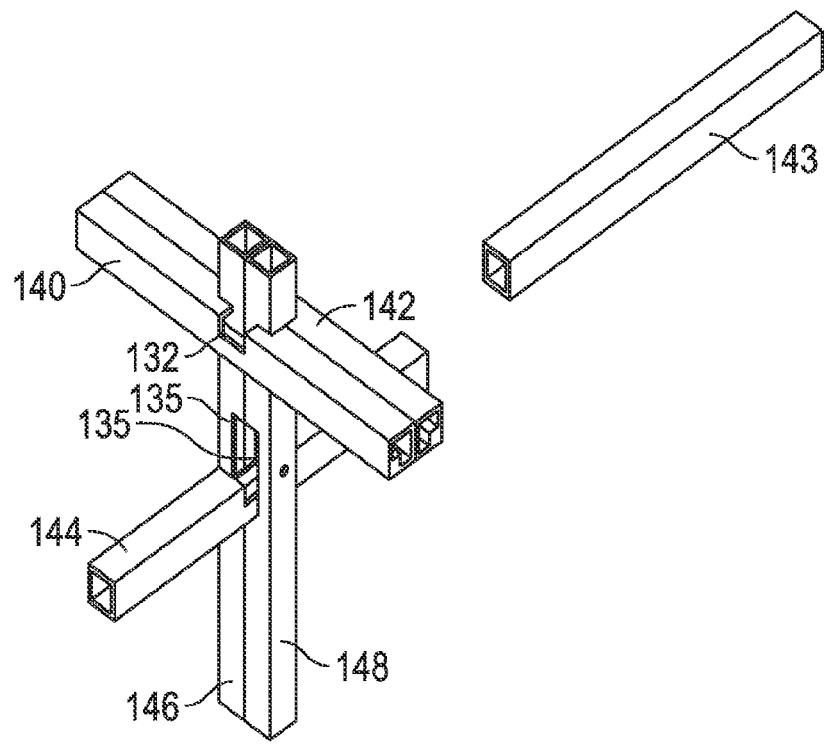
Figure 7:
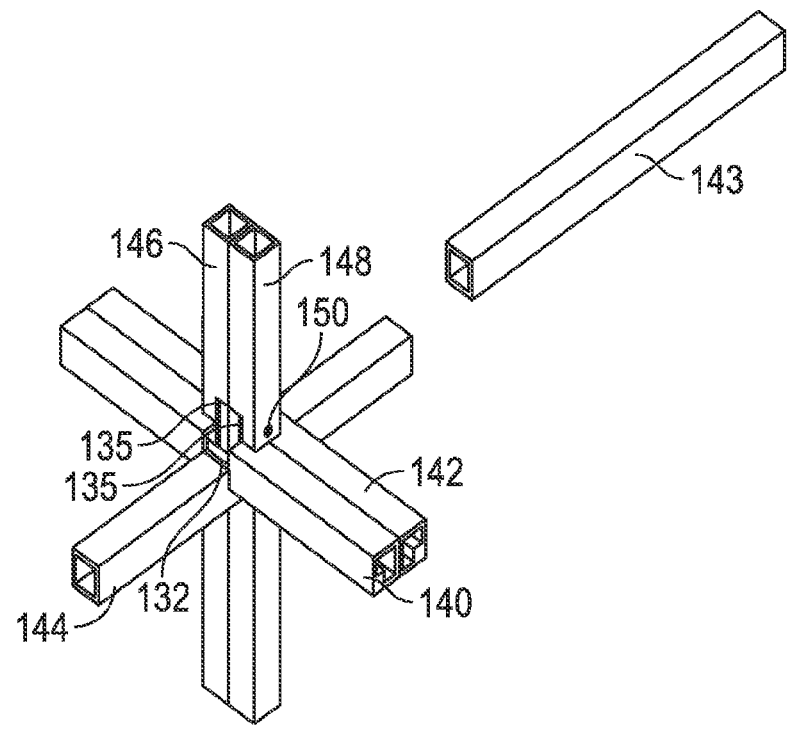
Figure 8:
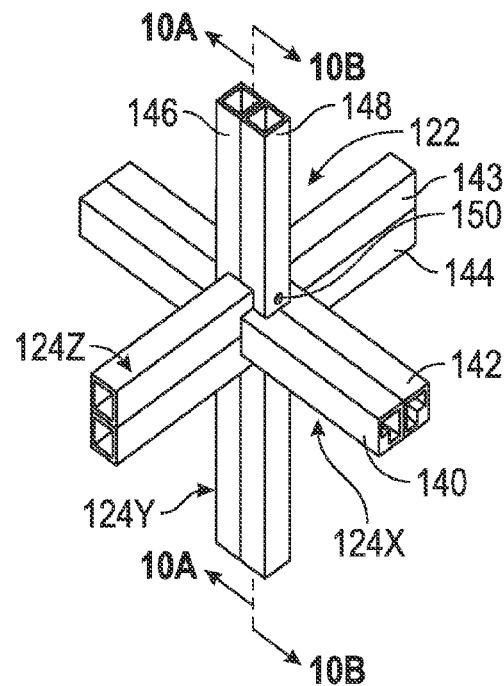
FIG. 8 illustrates the assembled corner joint.

FIG. 5 illustrates a first step in forming one of the corner joints or nodes 122. In this step, tubes 146, 148 are brought together into face to face engagement with the notches 135 aligned and tube 144 extending through the aligned notches, with the notch 134 inside the hole formed by notches 135. In the next step, the two tubes 140, 142 are brought together above the tube 144, with the tubes 146, 148 sandwiched between them and located in notches 132, as illustrated in FIG. 6. The tubes 140,142 are then slid downwards until they are seated in the notch 134 in tube 144, as illustrated in FIG. 7. The tube 143, which acts as a "key", is then extended through the open part of the hole formed by notches 135 and the upper parts of notches 132, as illustrated in FIG. 8. This interlocks the six members to form joint 122. It should be understood that the above process illustrated how a single joint is assembled, but in fact the entire structure 120 of FIG. 1 is assembled 132 joints at a time, in unison.

Figure 9:
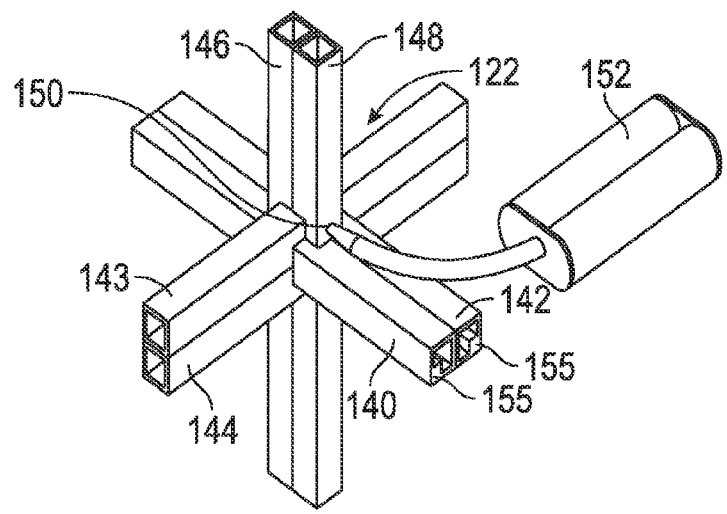
FIG. 9 illustrates injection of adhesive into the joint.

Once the members are interlocked at each joint 122, as illustrated in FIG. 8, a structural adhesive is injected from injection device 152 into the joint through injection holes 150 provided in members 148 and communicating with each joint and communicating with the interior of all six members of each joint, and even perhaps multiple diagonal members at the same time, as illustrated in FIG. 9. The adhesive spreads via the openings and notches in the tubes to fill the entire internal space within each tube at the joint, up to end stops 138 in each tube adjacent opposite ends of the joint area, which may be of lightweight foam material, and adheres to the internal surfaces of each member as it hardens to form monolithic plug 128, as illustrated in FIG. 10A. As an example, if the tubes illustrated are 1.0 inches square on a side, with a 0.125 inch wall thickness, the monolithic plug can have a volume of 7.6 cubic inches and provide a shear area on the internal side of all six members of 53.0 square inches. This shear area, when assuming conservative values of the adhesive's shear strength of 1000 psi, thus provides in all three directions a shear strength of 53,000 psi, which is a very remarkable strengthening addition to the joint. The applicant predicts this strength addition may translate to the joint being stronger than any individual member, which is the absolute best design result for a lattice space frame structure.

The cross brace members 125 may also be tubes similar to the tubes forming members 124X, 124Y and 124Z. A diagonal or cross brace member 125 may be secured to corner joints at diagonally opposite corners of each cell side (external or internal) in any desired manner. In one embodiment, each diagonal has a cut out or notch at each end designed to engage over the surfaces of the tubular members at the joint, and holes may be provided at appropriate locations in one or more tubular members at joint 122 for communicating with the interior of the diagonal member, which may comprise one or two tubes. This allows adhesive injected at hole 150 to flow into the diagonal member as well, and to bond to internal surfaces of the diagonal member so as to secure it to the joint. Alternatively, adhesive may be separately injected into the ends of the diagonal members. Furthermore, small "rebar" rods may be placed on all cavities of the joints, and diagonals, to give additional strength capability to the joints and the monolithic plug.

FIGS. 1 to 3 illustrate a multi-cell, single layer interlocking support structure 120 assembled as described above mounted on top of a support pole 140, with a plurality of solar panels 110 secured on the upper surface of structure 120. Additional layers may be added if desired, depending on the weight to be supported.

Composite support structure 120 as described above uses internal flowing structural adhesives with good interlaminar strength and bonding capability to create a monolithic but complex internal load caring internal structure, utilizing advances in structural adhesives. Advanced machining techniques in CNC may be used to create the joint structure, wherein very precise tolerances are achieved.

The internal structural adhesive adheres to area surfaces on the inside of the joint that are two orders of magnitude higher than the cross-sectional area of one member (i.e., a square tube with 0.5 in$^2$ of area sees an internal structural shape from the structural adhesive when hardened that etches into the internal sides of the pultrusion in over 50 in$^2$ of bond area).

Figure 11:
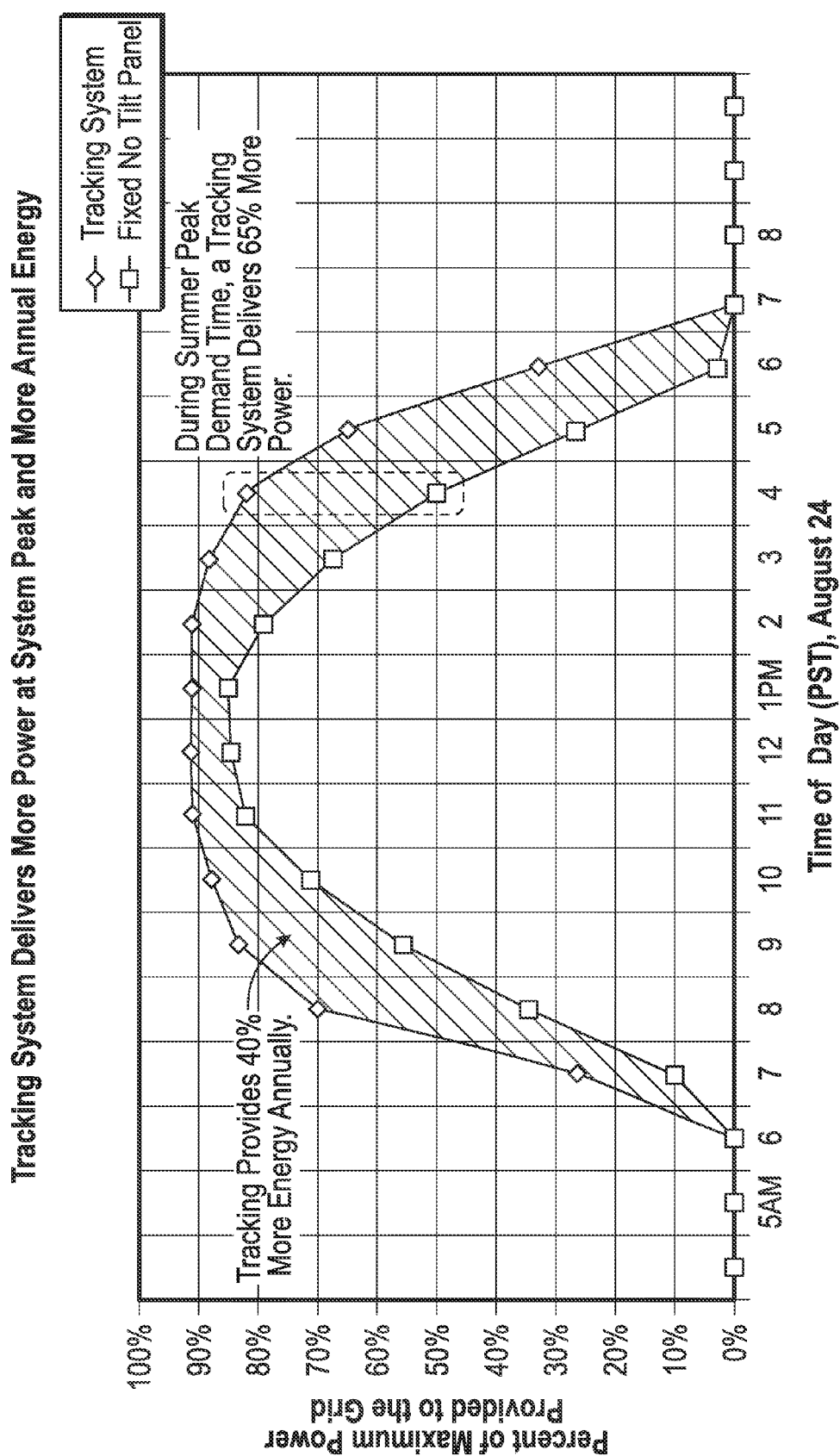
FIG. 11 is a chart showing an example of improved performance with a solar tracking system.

Another feature of the space frame composite support structure 120 is that it is very light (example above weighs 900 lbs.), and yet it is able to withstand relatively high loads (including extreme wind). This makes the space frame composite support structure 120 suitable for tracking the sun, by adding gimbals and suitable actuators for moving the panels to follow the sun. The ability to follow the sun may allow the photovoltaic panels 110 to achieve up to a 40% improvement in efficiency (See FIG. 11). In an alternative embodiment, the composite photovoltaic panel structure 100 uses mirrors in place of solar panels 110 and functions as a heliostat that tracts the sun and reflects on a tower, which is used for solar thermal electricity generation. In an alternate embodiment, the structure may be used as the tracking heliostat in a Stirling engine system.

In an embodiment of the composite photovoltaic panel structure 100, aspects of the composite photovoltaic panel structure 100 include the following: a "snap-together" structure that is lightweight, pre-manufactured for rapid field assembly, and capable of meeting extreme loading conditions; a lower installed cost system; a corrosion free or corrosion resistant system with a lifetime potentially matching the life of the solar panels and, unlike field-welded steel, is rust free or rust resistant; and is an architecturally advanced and pleasing structure. The thermal expansion of a glass reinforced composite structure can match the same expansion as the solar glass glazing.

In an embodiment, the composite photovoltaic panel structure 100 holds 50 Sharp panels of the 216 Watt design; the nodes or corner joints 122 on the upper surface of the space frame composite support structure 120 provide nesting corners for the rectangular panels 110 where the ends of the y-directed members 124Y project from the upper surface of the panel. The spacing of the nodes or corner joints may be easily adjusted for different panel manufactured dimensions. Thus, the cell dimension and location of the corner joints is selected based on the size of the panels to be supported on top of the support structure 120.

The table below summarizes advantages of the composite photovoltaic panel structure 100 over exemplary prior art:

| Desired Feature | Prior Art | Composite photovoltaic panel structure 100 |
| --- | --- | --- |
| Lightweight | 5.5 lbs per sq ft | 1.0 lbs per sq. ft |
| Pre-manufactured for field assembly; minimum fasteners | Custom site fabrication required; typically field-welded | Kits produced at factory; Snap-lock space frame has no fasteners |
| Minimal down time for assembly | Team of installers required; impacted by weather conditions; can take 7 days leaving site unusable for client | Two installers can assemble an entire structure in less than 8 hours on a foundation-ready-site; minimal impact in adverse weather |
| Meet extreme loading conditions | Yes | Yes |
| Low cost | (?) Unknown | $7000- $8000 per structure |
| Low installation cost; low cost of hoist-rentals | Can take 7 days, including 3 days for paint to dry; requires | One day; low installed cost; Small boom lift at |

-continued

| Desired Feature | Prior Art | Composite photovoltaic panel structure 100 |
|---|---|---|
| | mid-sized crane rental | $600/day rental |
| Corrosion free | Field-welded steel, even after painting, will rust within 5-10 years | Composite materials will not corrode over 50 years |
| Architectural Style | Beam and Purlins | State-of-the-art composite space-frame |
| Aesthetically pleasing | Yes, when new, when rust appears: no | Space-frame snap-lock one-of-a-kind |
| Support commercially available panels | Yes | Yes |
| Easy to install a series of structures, side-by-side | Series of structures must be attached at edges for load-sharing; not self-standing | Each space-frame capable of passing all loading criteria independently; no edge connection required |
| Can be certified in all 50 states | Yes | Yes |
| 50 year life | Yes, with frequent maintenance (painting) | Yes, with no maintenance |
| Requires No Paint | No | Yes |
| Option for tracking sun; 40% power increase | No; very heavy; not currently an option | Yes, viable option estimated $8000 addition |
| High Volume Kits Possible | No | Yes |

The space frame composite support structure 120 is a four-point support system at four different space-frame-nodes. The primary reason for this is to allow for distributed reaction loads and to provide a unique feature for future structures wherein low cost actuator/ball-screws can be added for active control/sun-tracking. In the embodiment shown, the dimensions of the space frame composite support structure 120 are 401.10 in. by 328.05 in.×18.0 in.

In viewing the loads, it is clear that the weight of the space frame composite support structure 120 is relatively low. The space frame composite support structure 120 using the materials and dimensions in the example described above weighs approximately 1.0 lb. per sq. ft. of panel area. The panels 110 weigh 2.5 lbs. per square ft. This structure weight of 1.0 lbs. per sq. ft. is significantly lower than the reported steel weight of 5.5 lbs. per sq. ft. Wind loading of 85 miles per hour (gusts) inputs the most significant loads to the structure. Uploading and down loading, assuming an actual platform area of the 50-panel structure and a force coefficient of 3.0, yields a load that is at least 50% higher than would be actually witnessed during an 85 mile per hour gust. A downward load from the weight of the space-frame of 900 lb. may be assumed, along with assumed solar panel downward load of 2205 lbs., and assumed total loads with wind of 39,900 lbs. downward and 33,700 lbs. upward. In applications where there is a series of structures installed side-by-side, there is no need to attach each cascading structure together.

The composite photovoltaic panel structure 100 may be assembled rapidly; it is estimated two installers could assemble an entire structure in less than 8 hours on a foundation-ready site. The structure would be assembled on the ground and hoisted by a small boom lift. This design has the potential for extremely high deployment as it eliminates custom site fabrication.

In alternative embodiments, the four support points where arms 130 connect to nodes 122 can be modified with gimbaled actuators associated with a servo mechanism to orient the space frame toward the sun during the day, if tracking is desirable. There is a 3 for 2 efficiency advantage for tracking, as shown on the attached chart in FIG. 11. The very light-weight nature of this frame/panel system allows a simple, low-cost tracking system to be incorporated.

Due to the high glass content of the composite used in the space frame composite support structure 120, the structural members may be exposed for 50-years to the sun's UV rays with little or no structural degradation. In one or more embodiments, the space frame composite support structure 120 may have its hollow composite members pre-wired to hide all wiring from the public.

Key elements of the space frame composite support structure 120 include plugging the hollow tubes up a short distance from the center of the hollow tubes, so that when the structural adhesive is injected into the assembled joint, it flows a predetermined distance in each member from the center of the joint; compression-only-diagonals are also injected with flow from the structural adhesive to hold in place; rebar (either coated-steel or composite) may be added to the interior of each joint to add further strengthening of the composite joint. Applications from housing to large structures can benefit from this space frame composite support structure.

In one embodiment, all six interlocking members are made from the same pultrusion. In the embodiment shown, two of these members (specifically members 140, 142) would lose more cross-sectional area than the rest, due to the larger size notches 132, but for the fact that the pultrusion die is modified with a different internal mandrel, such that no member has less than 50% of its area lost for machining notches. Then, the structural adhesive providing the monolithic plug makes up for the 50% lost plus additional strength, so that space frame will fail in members and not joint at its ultimate stress. In FIGS. 4-9, and 10A, and 10B, the members 140 and 142 show an additional internal longitudinal wall or enlargement 155 in a one-quarter region of the member cross section. This allows 140 and 142 to lose no more than 50% of their cross sectional area due to the necessary aggressive notching of these two members.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

We claim:

1. An interlocking support structure, comprising:
   an array of rectangular cells arranged in at least one layer, each cell having four sides, opposite ends, and eight corners, and sharing common sides and corners with any adjacent cells;
   the cells being formed by a first set of elongate structural members extending parallel to one another in at least two spaced planes, a second set of elongate structural members extending parallel to one another and at an angle to the first set in the same two spaced planes, the first and second set of structural members intersecting at the corners of the array of cells, and a third set of elongate structural members extending parallel to one another between the two planes at the corners formed by the first and second sets of structural members and interlocking with the first and second sets of structural members to form corner joints at each intersection of the first, second, and third sets of structural members;

each structural member having a hollow interior at least at the joints and communicating with the other structural members at least at the corner joints to form a hollow corner joint; and wherein the structural members have end stops within the hollow interior at predetermined spacings from the center of each joint and a single monolithic adhesive plug filling the hollow corner joint and the hollow interior of the structural members at each corner joint up to the end stops and adhered to internal surfaces of the structural members at the joint to secure the structural members together at the joints.

2. The structure of claim 1, wherein each elongate structural member comprises a pair of tubes of rectangular cross-section extending side-by-side.

3. The structure of claim 1, further comprising an X brace structure in each side of a cell or common side of two adjacent cells, each X-brace structure comprising a first diagonal member extending between a first pair of diagonally opposite corners of the respective side and a second diagonal member extending between a second pair of diagonally opposite corners of the respective side and crossing the first diagonal member to form an X-shape.

4. The structure of claim 3, wherein each first diagonal member has opposite ends secured to the corner joints at the first pair diagonally opposite corners of a respective side and each second diagonal member has opposite ends secured to the corner joints at the second pair of diagonally opposite corners of the respective side.

5. The structure of claim 1, wherein the plug is formed from a hardened, initially flowable material.

6. The structure of claim 5, wherein the plug material is selected from the group consisting of adhesives, concretes, and epoxy materials.

7. The structure of claim 6, wherein the plug material is a structural adhesive.

8. The structure of claim 1, wherein the array has an upper surface and a lower surface, and at least one photovoltaic panel is supported on the upper surface of the array.

9. The structure of claim 8, further comprising a vertical support assembly which supports the array at a selected height, the support assembly including a servo mechanism for adjusting the orientation and position of the support structure to track the sun.

10. The structure of claim 1, wherein each structural member is a hollow tubular member.

11. The structure of claim 10, wherein each hollow tubular member is a rectangular pultrusion of composite material.

12. The structure of claim 11, wherein the composite material is a resin impregnated fiber composite material.

13. The structure of claim 1, wherein the structural members of at least one set have a plurality of fill holes, each fill hole being located at a respective corner joint.

14. The structure of claim 1, further comprising a vertical support assembly which supports the array at a selected height, the support assembly having a ground engaging base, an upright pole extending from the base, and a plurality of support arms extending in different directions from the pole and secured to respective spaced corner joints in a lower plane of the array.

15. The structure of claim 14, wherein the support arms extend upwardly at an angle to the pole and are secured to corner joints defining a rectangular area in the lower plane of the array.

16. An interlocking support structure, comprising: an array of rectangular cells arranged in at least one layer, each cell having four sides, opposite ends, and eight corners, and sharing common sides and corners with any adjacent cells, the array having an upper surface and a lower surface; a vertical support assembly which supports the array at a selected height, the support assembly having a ground engaging base, a vertical pole, and a plurality of arms which connect the pole to the lower surface of the array;

the cells being formed by a first set of elongate structural members extending parallel to one another in at least two spaced planes, a second set of elongate structural members extending parallel to one another and at an angle to the first set in the same two spaced planes, the first and second set of structural members intersecting at the corners of the array of cells, and a third set of elongate structural members extending parallel to one another between the two planes at the corners formed by the first and second sets of structural members to form corner joints at each intersection of the first, second, and third sets of structural members;

each arm of the support assembly having a first end secured to the pole and a second end secured to a respective corner joint in the lower surface of the array;

each structural member having a hollow interior at least at the joints and communicating with the other structural members at least at the corner joints to form a hollow corner joint; and wherein the structural members have end stops within the hollow interior at predetermined spacings from the center of each joint and a single monolithic adhesive plug filling the hollow corner joint and the hollow interior of the structural members at each corner joint up to the end stops and adhered to internal surfaces of the structural members at the joint to secure the structural members together at the joints.

17. The support structure of claim 16, wherein the arms of the support assembly comprise four arms extending upwardly at an angle to the pole and having upper ends connected to respective corner joints which define four corners of a rectangular shaped region of the lower surface of the array.

18. A method of assembling a support structure, comprising:

arranging a first set of tubular structural members to extend parallel to one another in an x-direction in a first plane and a second set of tubular structural members to extend parallel to one another in an x-direction in a second plane parallel to the first plane;

arranging a third set of tubular structural members to extend parallel to one another in a y-direction transverse to the first and second planes to intersect with the first and second sets of tubular structural members at corner joints in the first and second planes;

arranging a fourth set of tubular structural members to extend parallel to one another and transverse to the first set of tubular structural members in a z-direction in the first plane and to intersect with the first and third sets of tubular structural members at the corner joints in the first plane;

arranging a fifth set of tubular structural members to extend parallel to one another and transverse to the second set of tubular structural members in a z-direction in the second plane and to intersect with the second and third sets of structural members at the corner joints in the second plane;

whereby a plurality of rectangular cells are formed in an array, each rectangular cell having eight corners defined by respective intersecting corner joints, four sides, and opposite ends, and sharing common sides and corners with any adjacent cells;

each structural member having a hollow interior at least at the joints and communicating with the other structural members at least at the corner joints to form a hollow corner joint;

the structural members having end stops within the hollow interior at predetermined spacings from the center of each joint;

injecting an adhesive flowable material into the hollow corner joint and the hollow interior of the intersecting structural members at each corner joint through at least one fill hole in at least one of the structural members at the respective corner joint; and allowing the flowable material in each corner joint to flow into and fill the hollow interior of the structural members at each corner joint up to the end stops, harden and adhere to internal surfaces of each structural member at the corner joint to form a single monolithic adhesive plug.

19. The method of claim 18, wherein the injecting step comprises injecting material through at least one hole in one of the intersecting structural members at each corner joint.

20. The method of claim 18, wherein the injecting step comprises injecting a flowable material selected from the group consisting of structural adhesives, cement, and epoxy material.

* * * * *